H. BART.
NUT LOCK.
APPLICATION FILED SEPT. 12, 1910.
1,038,479.
Patented Sept. 10, 1912.
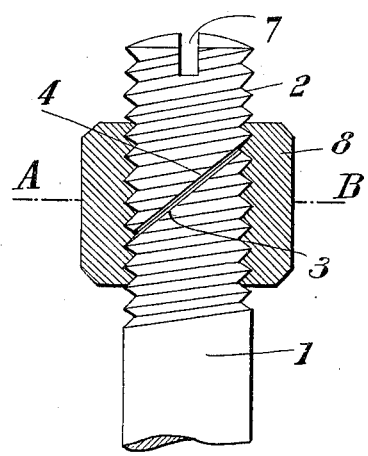
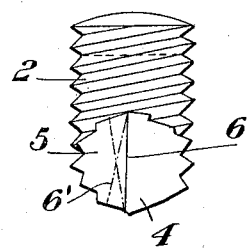
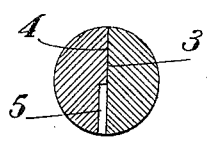
Witnesses:
E. M. Moore.
L. E. Barkley.
Inventor:
Henri Bart
by Frank S. Anderman.
Attorney.

UNITED STATES PATENT OFFICE.

HENRI BART, OF PARIS, FRANCE.

NUT-LOCK.

1,038,479.  Specification of Letters Patent.  Patented Sept. 10, 1912.

Application filed September 12, 1910. Serial No. 581,526.

*To all whom it may concern:*

Be it known that I, HENRI BART, a citizen of the French Republic, and resident of Paris, France, have invented a certain new and useful Nut-Lock, of which the following is a specification.

This invention relates to a screw bolt with nut prevented from becoming loose by accident and locked automatically under the influence of vibrations.

The peculiar features of this system reside essentially in the fact that the screw bolt is cut obliquely at a place which, when the connection is operated, will be positioned inside the nut, the said section producing two distinct parts one of which is in turn cut away laterally so that when the nut is tightened the plane surfaces of both parts apply themselves on each other inside the nut so that the free cut away end of the bolt exactly forms the prolongation of the screw threaded part of the bolt and allows of the nut being tightened, while when the nut shows the slightest tendency of becoming loose, it carries with it the said free part thanks to the cut away part of the surface of one of the parts of the screw threaded shank, the said carrying on of the cut end of the bolt producing a relative motion between this part and the remainder of the bolt and consequently a wedging action between the screw threads engaged, which wedging effect in turn produces the locking of the nut.

In the accompanying drawing: Figure 1 is an elevation view of a screw bolt with nut constructed according to the principles of this invention, the nut being shown in section; Fig. 2 is a cross sectional view of same on line A—B of Fig. 1; Fig. 3 shows the cut away end of the screw threaded shank in side elevation, but rotated 90 degrees with reference to the position shown by Fig. 1.

As shown by these figures, the screw threaded shank of the screw bolt is cut obliquely with reference to its axis so as to cut away therefrom the end 2 which thus forms an independent part. When the two parts 1 and 2 of the screw bolt thus obtained are placed in the prolongation of each other so as to bring the two surfaces 3 and 4 into contact with each other, they allow of the nut being screwed on the bolt without any difficulty exactly as if the bolt were not in two pieces. The inclines 3 and 4 form both the same angle with the axis of the part to which they appertain.

In the form of embodiment shown by way of example in the drawing the face 3 which forms the end of the screw bolt proper is formed by a single surface while the face 4 of part 2 is cut away on a part of its width so as to produce a depression 5. It is needless to say that the reverse might be done *i. e.* the face 4 of the part 2 be left integral and the cut away portion 5 be positioned on the face 3 of shank 1 without departing from the spirit of the invention. However care must be taken that the cut 5 should always be on that side of the bolt on which, when unscrewed, the nut will turn in a direction away from the edge of the detached portion of the bolt. The cut 5 is obtained by removing a part of the face 4. This removal may be effected in such a manner that the line 6 separating the removed part from the remainder of the surface be parallel to a plane which is perpendicular to the surface 4 and contains the longitudinal axis of the corresponding part of the screw threaded shank or be obliquely directed with reference to said plane, as shown by the dot and dash lines 6' of Fig. 3. The cut away part 5 is always a little smaller than the half of the total surface 4 so as to position the separating line 6 or 6' on the side of the axis of the screw threaded rod. The cut away part 5 may be formed by a simple notch. The part 2 is provided at its end with a slot 7 allowing of the end of a screw driver being inserted therein. The nut 8 has no other distinctive feature than an increased length.

The function of the above described connecting system is as follows: After the shaft 1 has been passed through the parts to be bolted together, the part 2 is placed on the end of the part 1 and the nut is screwed thereon. It will be easily understood that the length of the shaft 1 with reference to the parts to be connected together must be calculated in such a manner that when the nut is tight, it covers the line of separation between the parts 1 and 2. During the tightening operation, the nut presses the two surfaces 3 and 4 on each other; as to this position the screw threads of parts 1 and 2 are perfectly in line with each other, the tightening operation may be carried out without difficulty. If on the contrary owing to vibration, expansion or any other cause, the nut has a tendency to become loose, it carries with it in its motion the movable part 2 and owing to the inclined edge 6 or 6' on the opposite incline 3, the screw threads of the parts 1 and 2 are caused to come out of register. From this moment, any further shifting of the nut in the direction of untightening has for its effect to produce a wedging action between its screw threads and those of the parts 1 and 2. Thanks to the possibility to obtain an efficient wedging action by a very small shifting of the part 2, the slight untightening motion of the nut which takes place during the aforesaid sliding can in no case produce a play between the parts to be connected together. When an authorized person desires to untighten the nut, all that he has to do is to hold the cut away part 2 in the position which it had when the nut has been put in position that is to say with the surfaces 3 and 4 applied upon each other. This immobilization of the part 2 is obtained by means of a screw driver engaged into the slot 7, the screw being withdrawn in the usual manner.

Having now fully described my said invention, what I claim and desire to secure by Letters Patent is:—

A nut lock comprising a nut and a threaded bolt having a plane surface disposed at an angle of approximately forty-five degrees to the axis of the bolt, and a threaded bolt section having two approximately equal surfaces disposed on parallel planes and at an angle of approximately forty-five degrees to the axis of the bolt and fitted into the nut into contact with the first said plane surface.

In testimony whereof I have hereunto set my hand in presence of two witnesses.

HENRI BART.

Witnesses:
 H. C. COXE,
 JACK H. BAKER.

---

Copies of this patent may be obtained for five cents each, by addressing the "Commissioner of Patents, Washington, D. C."